US008352658B2

(12) United States Patent
Tarta et al.

(10) Patent No.: US 8,352,658 B2
(45) Date of Patent: Jan. 8, 2013

(54) FABRIC BASED LOCK MANAGER SERVICE

(75) Inventors: Mihail Gavril Tarta, Sammamish, WA (US); Gopala Krishna R. Kakivaya, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 397 days.

(21) Appl. No.: 12/788,371

(22) Filed: May 27, 2010

(65) Prior Publication Data

US 2011/0296069 A1    Dec. 1, 2011

(51) Int. Cl.
*G06F 12/00* (2006.01)
(52) U.S. Cl. ..................................... 710/200
(58) Field of Classification Search .................. 710/200
See application file for complete search history.

(56) References Cited

U.S. PATENT DOCUMENTS

| | | | |
|---|---|---|---|
| 5,991,845 A * | 11/1999 | Bohannon et al. | 710/200 |
| 6,751,616 B1 * | 6/2004 | Chan | 1/1 |
| 6,754,656 B1 * | 6/2004 | Cornwell et al. | 1/1 |
| 7,047,337 B2 * | 5/2006 | Armstrong et al. | 710/200 |
| 7,426,653 B2 | 9/2008 | Hu et al. | |
| 7,447,786 B2 * | 11/2008 | Loaiza et al. | 709/229 |
| 7,480,653 B2 * | 1/2009 | Cornwell et al. | 1/1 |
| 7,496,574 B2 | 2/2009 | Walker | |
| 2004/0019892 A1 * | 1/2004 | E. et al. | 718/107 |
| 2006/0053111 A1 | 3/2006 | Bradley | |
| 2006/0212573 A1 * | 9/2006 | Loaiza et al. | 709/225 |
| 2006/0253856 A1 * | 11/2006 | Hu et al. | 718/104 |
| 2008/0082761 A1 | 4/2008 | Herness et al. | |
| 2008/0243847 A1 | 10/2008 | Rasmussen | |
| 2008/0288646 A1 | 11/2008 | Hasha et al. | |

OTHER PUBLICATIONS

Burrows, Mike., "The Chubby lock service for loosely-coupled distributed systems", Retireved at << http://static.googleusercontent.com/external_content/untrusted_dlcp/labs.google.com/en/papers/chubby-osdi06.pdf >>, Operating Systems Design and Implementation, Proceedings of the 7th symposium on Operating systems design and implementation, Nov. 6-8, 2006, pp. 16.

Hejtmanek, et al., "Distributed Data Storage with Strong Offline Access Support", Retirved at << http://ieeexplore.ieee.org/stamp/stamp.jsp?tp=&arnumber=4137071 >>, ICCGI, Proceedings of the International Multi-Conference on Computing in the Global Information Technology, Mar. 4-9, 2007, pp. 6.

Branco, Miguel., "Distributed Data Management for Large Scale Applications", Retrieved at << http://eprints.ecs.soton.ac.uk/18312/5/draft.pdf >>, RIDE, Proceedings of the 7th International Workshop on Research Issues in Data Engineering (RIDE '97) High Performance Database Management for Large-Scale Applications, Apr. 7-8, 1997, pp. 191.

"Azure Services Platform", Retrieved at << http://en.wikipedia.org/wiki/Azure_Services_Platform >>, no later than May 18, 2010, pp. 3.

(Continued)

*Primary Examiner* — Paul R Myers
*Assistant Examiner* — Christopher A Daley
(74) *Attorney, Agent, or Firm* — Ogilvie Law Firm

(57) ABSTRACT

A replicated finite state machine lock service facilitates resource sharing in a distributed system. A lock request from a client identifies a resource and a lock-mode, and requests a leaseless lock on the resource. The service uses client instance identifiers to categorize requests as duplicate, stale, abandoned, or actionable. A lock may be abandoned when a client holding the lock goes down. After a per-client abandonment timer expires, the lock service may treat any exclusive lock granted to the client as abandoned, and treat any non-exclusive lock granted to the client as unlocked. The service tries to notify a lock-holding client if another client requests the same lock, and treats the lock as abandoned if the notification attempt fails. An abandoned read lock is granted to a different client on request. An abandoned write lock is granted or refused depending on whether the requesting client accepts abandoned write locks.

20 Claims, 2 Drawing Sheets

OTHER PUBLICATIONS

"Distributed lock manager", Retrieved at << http://en.wikipedia.org/wiki/Distributed_lock_manager >>, no later than Feb. 25, 2010, pp. 4.

"Fabric computing", Retrieved at << http://en.wikipedia.org/wiki/Computing_fabric >>, no later than Apr. 21, 2010, pp. 2.

"Replication (computer science)", Retrieved at << http://en.wikipedia.org/wiki/Replication_(computer_science) >>, no later than Apr. 30, 2010, pp. 5.

"State machine replication", Retrieved at << http://en.wikipedia.org/wiki/State_machine_replication >>, no later than Mar. 20, 2010, pp. 7.

* cited by examiner

FABRIC BASED LOCK MANAGER SERVICE

BACKGROUND

Locks are used in distributed software to control access to shared resources. In some cases, a distributed lock manager (DLM) provides distributed applications with a mechanism for synchronizing their accesses to shared resources. For example, DLMs are used in some clustered file systems for file locking and for coordination of other disk accesses. The resources that are accessed under locks granted by a DLM may be files, records, areas of shared memory, peripherals, databases or portions of a database, and/or other items that are shared (or potentially shared) by different software processes.

A lock may provide different kinds of access to a given resource, depending on the accesses already granted and the operations desired, for example. Different kinds of access are sometimes indicated as lock modes. For example, a lock request specifying a concurrent read mode could be used to indicate a desire to read a resource identified in the request without updating (writing) the resource. As another example, an exclusive mode indicates a desired for exclusive access which allows both reads and updates to the locked resource and prevents other software processes from having any access to the resource until the exclusive lock is released. Other lock modes may also be available in a given implementation of a DLM.

SUMMARY

Software processes in a distributed system may share resources. However, shared resources may take inconsistent states and cause errors if concurrent accesses by multiple readers or writers are not properly controlled. Some embodiments described herein provide a distributed lock management service. In a partition of the lock service, a lock request from a client of the lock service identifies a resource and a lock-mode, and requests a lock on the resource. The lock service may be implemented using a replicated finite state machine.

The service determines whether any lock granted to the client on the resource is still in force; granted locks may be leaseless locks which do not have a termination time specified when they are granted. If the client has been granted a lock on the resource and the lock is still in force, then the service compares a client instance identifier of the granted lock with a client instance identifier of the lock request, and proceeds as described further below. Then the service replicates state of the partition to at least one secondary replica of the partition. Lock service state is also replicated after other changes, e.g., when a lock request is granted or refused, or when the lock service learns that a client holding a lock has gone down.

Assume that the client has been granted a lock on the resource and the lock is still in force. In some embodiments, if the client instance identifier of the granted lock is the same as the client instance identifier of the lock request, then the lock service partition categorizes the lock request as a duplicate request. If the client instance identifier of the granted lock is newer than the client instance identifier of the lock request, the lock service partition categorizes the lock request as a stale request. If the client instance identifier of the granted lock is older than the client instance identifier of the lock request, the lock service partition categorizes the lock request as an abandoned request. On the other hand, if the service determines there is no lock granted to the client on the resource and still in force, the service may grant the lock request and then replicate state of the partition.

Some embodiments handle abandonment of locks. A lock may be abandoned, for example, when a client holding the lock goes down without releasing the lock. Some embodiments create an abandonment timer for the client when the client is granted a lock. After the abandonment timer expires and the client fails to respond to an inquiry from the service, the lock service treats any exclusive lock granted to the client as an abandoned lock, and treats any non-exclusive lock granted to the client as if it has been unlocked by the client. In some embodiments, if the abandonment timer finds the client to be alive, then it re-enqueues itself. Eventually, the client either unlocks the lock, or the abandonment timer declares the client down, or the lock notification declares the client down.

Some embodiments attempt to notify a lock-holding client if another client requests the same lock. If the notification attempt fails, the service may treat the lock as having been abandoned by the client that held it. Also, if the service learns that a client who holds a lock is down (e.g., from a failure detector component of a fabric), then the service may treat the lock as having been abandoned by that client. In some embodiments, these are the same in that notification will be considered to have failed only when the failure detector marks it as failed. Some embodiments use a "perfect failure detector" which guarantees reliable detection of failures. If a lock is a read lock, then treating the lock as having been abandoned may include retracting the lock and granting the retracted lock to a different client who has requested it. If a lock is a write lock, then treating the lock as having been abandoned may include retracting the lock and granting the retracted lock to a different client who has requested it and who has also been identified as a client that accepts abandoned write locks. If a client does not accept abandoned write locks, then the client's request for such a lock will be refused. Different error codes may be given to the client for different errors, e.g., one code for refusal based on a client non-acceptance of an abandoned write lock, another code for out-of-memory, and so on.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
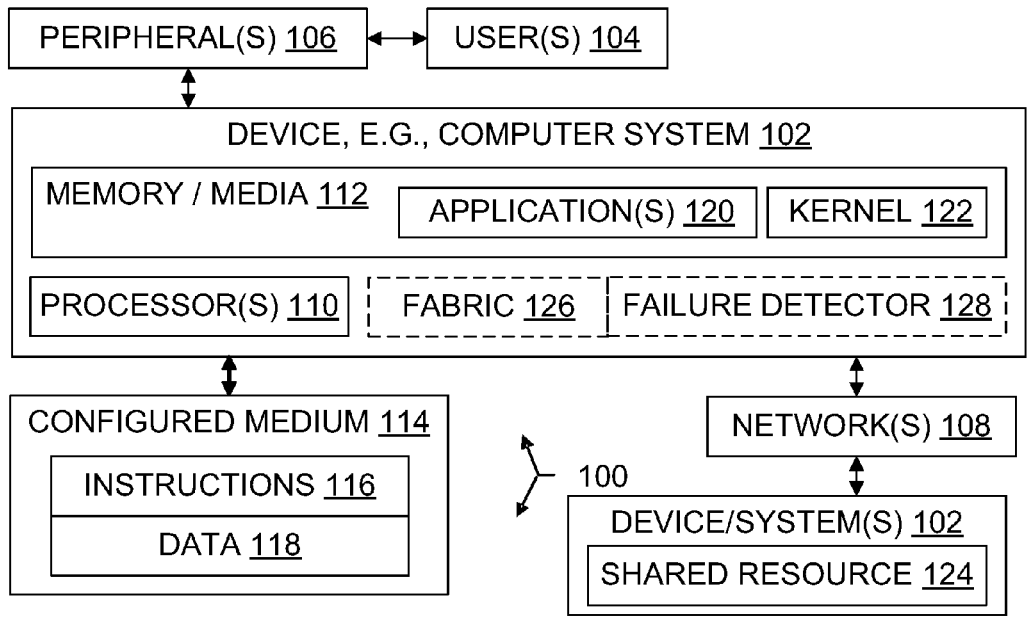
FIG. 1 is a block diagram illustrating a distributed computer system of networked individual computer systems having at least one processor and at least one memory, at least one individual system having an application which requests a lock on a resource located in this example on another individual system, and other items in an operating environment on multiple network nodes, and also illustrating configured storage medium embodiments.

In a large scale distributed computation system, distributed services may involve synchronized access to shared resources. Cloud services such as distributed file systems or distributed databases may be called on to provide isolation and consistency guarantees. Developers may seek mechanisms to protect shared resources in the distributed system if they are accessed concurrently by multiple readers or writers, and a granular concurrency control scheme to minimize contention. A service providing such functionality to distributed applications and/or other distributed services may be more useful if it is highly available and scalable.

In a rendezvous federation, clients route requests for a service to a logical destination referred to as a service rendezvous point. These routed service requests are processed by federation nodes which serve as rendezvous point owners. One service that could be provided at a rendezvous point is a distributed lock management service.

One complexity of a rendezvous federation compared to a client-server or master-slave model is that the rendezvous point ownership can change as nodes join and leave the federation. It may be desirable to shield clients of the service from this complexity and provide them from their perspective with service from a single, logically consistent, rendezvous point.

To provide a single, logically consistent service at a rendezvous point, state maintained at the rendezvous point could be replicated to help ensure that it is not lost when a node currently serving as the rendezvous point owner faults. This would allow a replacement node (one which replaces the faulted node as owner) to behave in a manner consistent with the actions taken by the faulted node prior to its failure. Put differently, in hindsight one can view this situation as one in which a replicated state machine can provide data consistency.

Some embodiments described herein provide a replicated lock management service at service rendezvous points. Some embodiments use a replicated state machine approach, which promotes high availability and scalability in a fabric of networked machines. Some embodiments handle lock abandonment by clients in particular ways described herein, employing failure detection as opposed to, or as a supplement to, a lock lease mechanism. Some embodiments provide lock client state machine processing for situations such as stale message detection.

The lock services described herein may be used in various ways. For instance, a lock service may form part of a mechanism that exposes application leader election by using exclusive locks. A lock service may form part of a data consistency layer in a distributed fabric that has a federation subsystem. A fabric based lock manager service may allow backend distributed services to benefit from a common scalable and reliable lock management infrastructure that can be used to achieve coarse or fine granularity locking of different distributed shared resources. This infrastructure can then be used to provide isolation, concurrency control, and consistency to higher level applications or business logic. It will be appreciated that other uses in other architectures can also be made of the lock services described herein.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, and/or device(s) providing one or more processors controlled at least in part by instructions. The instructions may be in the form of software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to synchronization, and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit. For example a hyper-threaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, and similar hardware interface software. A particular kernel may run on one machine, e.g., as a single-machine operating system, or on more machines, e.g., as a cloud operating system.

"Code" means processor instructions, data (which includes constants, variables, and data structures), or both instructions and data.

"Automatically" means by use of automation (e.g., general purpose computing hardware configured by software for specific operations discussed herein), as opposed to without automation. In particular, steps performed "automatically" are not performed by hand on paper or in a person's mind; they are performed with a machine.

Throughout this document, use of the optional plural "(s)" means that one or more of the indicated feature is present. For example, "lock(s)" means "one or more locks" or equivalently "at least one lock".

Throughout this document, unless expressly stated otherwise any reference to a step in a method presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as "transmitting to", "sending toward", "communicating to", or "notifying" a destination may involve intervening action such as forwarding, copying, uploading, downloading, encoding, decoding, compressing, decompressing, encrypting, decrypting and so on by some other party, yet still be understood as being performed directly by the party of interest.

Whenever reference is made to data or instructions, it is understood that these items configure a computer-readable memory thereby transforming it to a particular article, as opposed to simply existing on paper, in a person's mind, or as a transitory signal on a wire, for example.

Operating Environments

With reference to FIG. 1, an operating environment 100 for an embodiment may include a cluster, fabric, or other collection of networked computer systems 102. Each computer system 102 may be a multiprocessor computer system, or not, and may be clustered, client-server networked, and/or peer-to-peer networked, for example. The term "client" herein refers to a lock service client unless otherwise indicated. Thus, a lock service client may also be a client-server client, or a client-server server, or a peer-to-peer peer, for example.

Human users 104 may interact with a computer system 102 by using displays, keyboards, and other peripherals 106. System administrators, developers, engineers, and end-users are each a particular type of user 104. Automated agents acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

Each computer system 102 includes at least one logical processor 110. A system 102 may also include other hardware, such as buses, power supplies, and accelerators, for instance. The computer system 102, like other suitable systems, also includes one or more computer-readable non-transitory storage media 112. Media 112 may be of different physical types. The media 112 may be volatile memory, non-volatile memory, fixed in place media, removable media, magnetic media, optical media, and/or of other types of non-transitory media (as opposed to transitory media such as a wire that merely propagates a signal). In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a computer-readable storage medium 112. Some other examples of computer-readable storage media 112 include built-in RAM, ROM, hard disks, and other storage devices which are not readily removable by users 104.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the medium 114 in which they reside; when that memory is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed as discussed herein, e.g., by replicating, being treated as abandoned, being categorized, retracting, granting, locking, unlocking, binding, deployment, execution, modification, display, creation, loading, and/or other operations.

Application(s) 120, a kernel 122, other software, and other items shown in the Figures may reside partially or entirely within one or more media 112, thereby configuring those media. Applications 120 may include database applications, other search engines, document management software, software development environments and constituent tools, web analytics software, distributed file systems, and/or other software which utilizes shared resource(s) 124. Although shared resource 124 is shown in FIG. 1 on a different machine than the machine shown as having application(s) 120, it will be appreciated that a shared resource may be located in some cases on the same machine as an application process that seeks access to the resource.

The operating environment may include a fabric 126 of networked machines. In some cases, an operating environment includes a failure detector 128 which reliably indicates whether a particular machine in a fabric (other networked configuration) has gone done. The failure detector may send notices of such machine failures to administrative users and/or to processes elsewhere in the fabric that have registered an interest in such notices. The failure detector may operate by regularly polling machines, by monitoring communications to detect failures, by hardware-based powering-down signals, and/or by other mechanisms. The failure detector may be a combination of software and hardware.

Items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
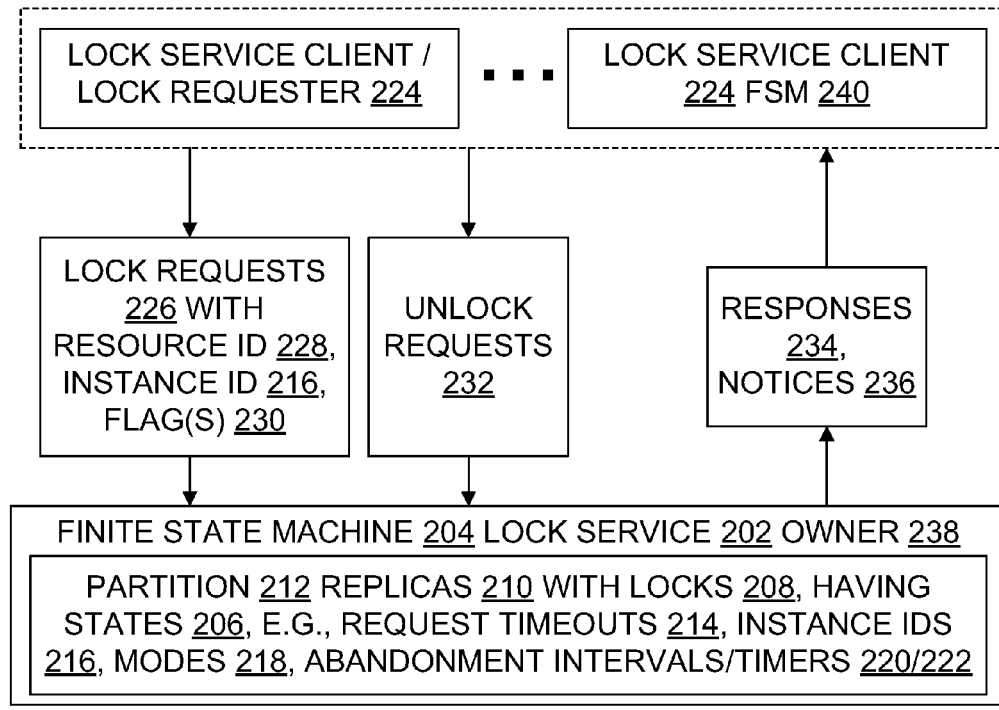
FIG. 2 is a data flow diagram illustrating a distributed lock service in an example architecture.

FIG. 2 illustrates an architecture which is suitable for use with some embodiments. A lock service 202 includes software and/or hardware implementing finite state machines 204, 240 which are tailored specifically for lock management as described herein. One finite state machine (FSM) 240 resides on each lock service client, and another finite state machine 204 resides on lock service servers. State 206 of locks 208 and other state information of the service-side finite state machine 204 is maintained in replicas 210. In some embodiments, a given partition 212 may have a primary replica and one or more secondary replicas, for example. In addition to lock states, replica states 206 may include request timeouts 214 specifying how long a client is willing to wait for a response to a lock request, instance IDs 216 identifying runtime instances of a client to distinguish between former and rebooted instances of a client, lock modes, and abandonment intervals/timers 220/222 for managing lock abandonment.

Lock service clients 224, also referred to as lock requesters 224, transmit lock requests 226 to the lock service 202 running on an owner 238 machine. In the illustrated embodiment, a given lock request 226 may include a resource ID 228 identifying the resource 124 sought to be locked, an instance ID 216 identifying the runtime instance of the lock requester, and optional flag(s) 230. A flag may be used, for example, to indicate whether this client will accept an abandoned write lock in response to this request. Clients 224 who have been granted a lock 208 and finished accessing the locked resource for the time being may release that lock by transmitting an unlock request, so that other clients have greater access to the resource. The lock service may send responses 234 to lock requests 226 and/or to unlock requests 232. In the illustrated embodiments, the lock service may also send inquiries such as notices 236 to clients who hold a lock that is being sought by another client.

Figure 3:
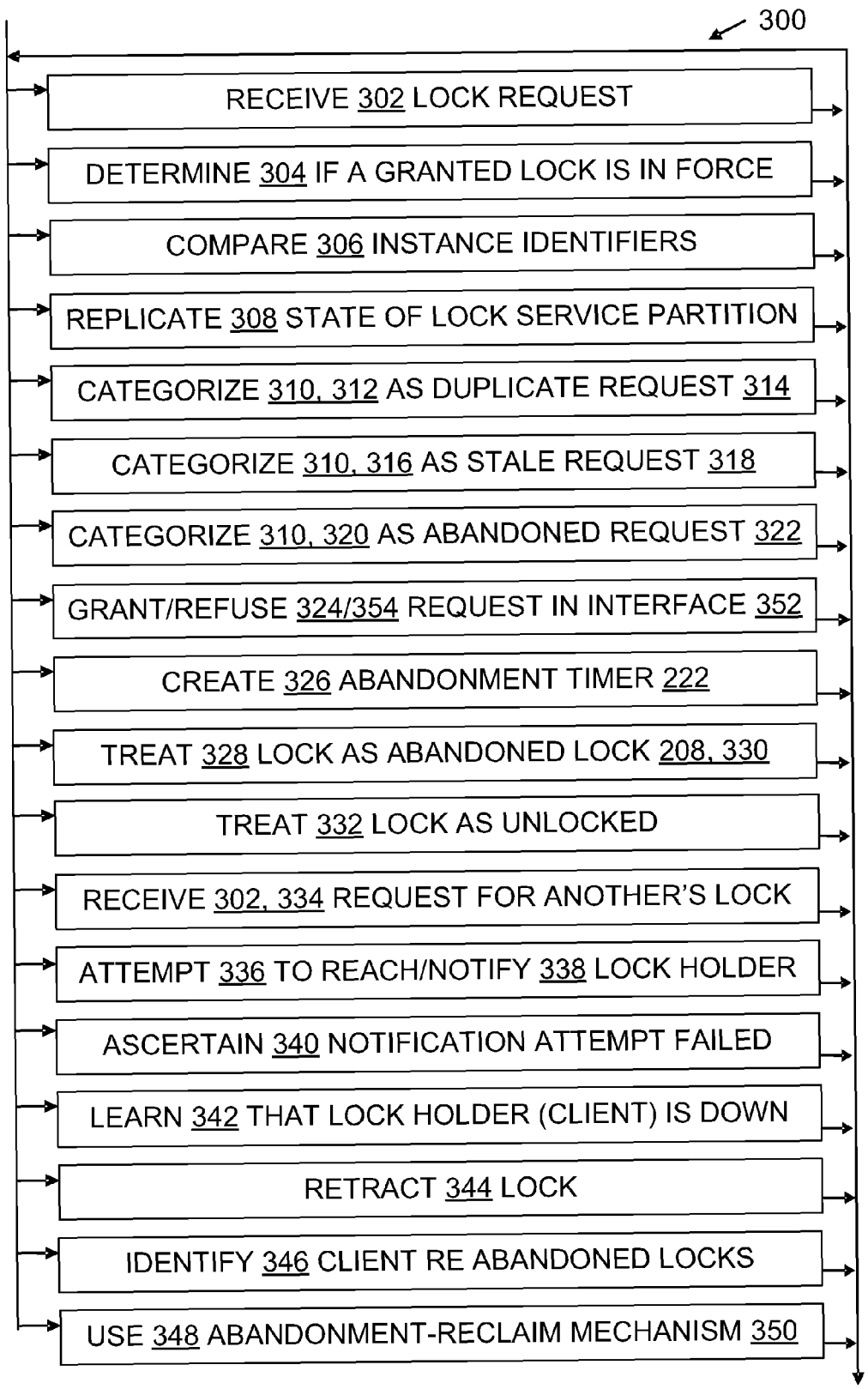
FIG. 3 is a flow chart illustrating steps of some method and configured storage medium embodiments.

With reference to FIGS. 1 through 3, some embodiments provide a computer system 102 with a logical processor 110 and a memory medium 112 configured by circuitry, firmware, and/or software to participate in and/or provide a lock service as described herein. A replicated finite state machine 204 resides in the memory 112. The finite state machine 204 is operable to receive lock requests 226 from clients, to deny lock requests, to grant leaseless locks 208 in response to lock requests, and to discover abandoned locks.

Some embodiments include a set of locks 208 residing in the memory 112, each lock having a lock-mode 218. Lock-modes 218 may vary between embodiments, but in general lock-modes make a distinction at least between read-only operations and update (write) operations that may be permitted under a granted lock, based on the lock's mode 218. In some embodiments, each lock 208 has a lock-request-abandoned-interval 220, which determines when a corresponding abandonment timer 222 for the client will expire. On expiration of a client abandonment timer 222, the client is pinged, and some embodiments will treat locks held by an unresponsive client as being abandoned or unlocked, depending on whether the lock mode is exclusive or non-exclusive. Some embodiments include a lock-request-timeout 214 for a given lock request, after the passage of which the lock request is deemed withdrawn by the client if no response 234 has yet been sent.

Some embodiments include a lock request interface 352 residing in the client 224 memory and/or the lock service owner 238 memory. The lock request interface may have an abandonment-reclaim mechanism 350, namely, a mechanism for indicating whether a client will accept a write lock that has been abandoned by another client. In some embodiments, the mechanism 350 includes a flag 230 in the lock request. The request content, including the flag, is generated through parameters passed by the client to the interface 352.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storage-retrieval and/or transmission approaches, or an embodiment in a computer system may operate without communicating with other computer systems.

Some embodiments operate in a "cloud" computing environment and/or a "cloud" storage environment. For example, applications 120 and client-side interface 352 code may be on multiple devices/systems 102 in a networked cloud, shared resources 124 may be stored on yet other devices within the cloud, and the lock server replicas 210 finite state machine code and state data may configure the memory on yet other cloud device(s)/system(s) 102.

Methods

FIG. 3 illustrates some method embodiments in a flowchart 300. Methods shown in the Figures may be performed in some embodiments automatically, e.g., by an application 120 under control of a script requiring little or no user input, with the application making lock requests 226 in the course of its operation and the lock service 202 responding automatically to those requests. Methods may also be performed in part automatically and in part manually unless otherwise indicated. In a given embodiment zero or more illustrated steps of a method may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a method may vary from one performance of the method to another performance of the method. The flowchart traversal order may also vary from one method embodiment to another method embodiment. Steps may also be omitted, combined, renamed, regrouped, or otherwise depart from the illustrated flow, provided that the method performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

During a request receiving step 302, an embodiment receives a lock request 226 or an unlock request 232. Step 302 may be accomplished using familiar network communication mechanisms adapted for receiving the specific data described herein, or another mechanism, for example, in conjunction with a finite state machine 204.

During a lock status determining step 304, an embodiment finite state machine 204 determines whether a client making a received 302 request has been granted a lock on a resource identified by a resource ID in the received 302 request. In some embodiments, step 304 also determines whether a granted lock is still in force. Step 304 may be accomplished by maintaining and referencing a queue, list, tree, table, hashed data structure, and/or other data structure(s) specifying which locks have been granted to which clients and the current status of those locks, e.g., "granted", "waiting", "abandoned", "unlocked", etc.

During an instance comparing step 306, an embodiment compares a client instance ID 216 in a received 302 lock request with a client instance ID 216 in a lock 208, by using familiar mechanisms for comparing two specified values, for example. Depending on the result of the comparison, the request may be treated as stale, as a duplicate, or as abandoned, in some embodiments.

During a state replicating step 308, an embodiment replicates state data of a lock service partition 212. For example, locks 208 (including current status) and other data values shown in the finite state machine 204 in FIG. 2, as well as received 302 requests 226, 232, may be replicated from a primary replica 210 to one or more secondary replicas 210 of a partition. Step 308 may be accomplished using familiar approaches to replicating specified data within partitions, for example, with the finite state machine being specified as data and code to be replicated.

During a request categorizing step 310, an embodiment categorizes a lock request 226 as duplicate, stale, abandoned, or actionable, based on contextual data. For example, during a categorizing step 310, 312 an embodiment categorizes a lock request as a duplicate request 314, namely, a duplicate of a request that was previously received 302 and was or is being processed by the service 202. During a categorizing step 310, 316 an embodiment categorizes a lock request as a stale request 318, namely, a request that has already been processed by the lock service 202. During a categorizing step 310, 320 an embodiment categorizes a lock request as an abandoned request 322, namely, a request that has been abandoned by the lock requester 224. Requests that are not duplicate, stale, or abandoned are actionable, and such requests may be granted or refused based on factors such as lock mode compatibility, acceptance of abandoned write locks, and request timeouts, for example.

During a lock request granting step 324, an embodiment grants a lock request 226. Granting step 324 may include updating state information in a lock 208 data structure and other state information in one or more replicas 210, and generating and transmitting a response 234 back to the requester 224, for example.

During an abandonment timer creating step 326, an embodiment creates an abandonment timer 222 for a client 224. Step 326 may use an embedded default interval 220, or an abandonment interval 220 may be specified by a client, in a lock request or another communication with the service 202, for example. Interrupt and other familiar timer mechanisms which have no specific knowledge of what occurs when a timer expires may be employed to implement the abandonment timer 222, for example. After the timer expires and the client fails to respond to an inquiry from the service 202, the client's lock(s) are treated as abandoned.

During an abandoned lock treating step 328, an embodiment treats a lock 208 as an abandoned lock 208, 330. For example, if the lock is a write lock (has a mode 218 allowing writing to the locked resource), then the embodiment may refuse to grant the lock to a client unless the client is identified 346 as a client that accepts abandoned write locks. If the lock is a read lock, then step 328 may include proceeding as though an express unlock request 232 had been received 302 unlocking the lock. Regardless, step 328 may include retracting 344 the lock, namely, revoking any access privileges obtained by virtue of having been granted the lock.

During a queue request receiving step 334, an embodiment receives 302 a request from one client 224 for a lock 208 currently held by another client.

During a notice attempting step 336, an embodiment attempts to notify 338 a client who holds a lock 208 that another client has requested that lock.

Attempting step 336 occurs whether or not the notice is received by the client, whereas notifying step 338 occurs only if the client who holds the desired lock actually receives a notice that another client has requested that lock.

During a client unavailability learning step 342, an embodiment learns that a particular client is down. As used here, "down" indicates that the client is rebooting, has been removed from the partition, has been removed from the network, is running an incompatible version of relevant software, or is otherwise unavailable. A service 202 may learn that a client is down from the client's failure to acknowledge a notice 236 or other communication, from an alert sent to the service by a failure detector 128, or from direct input by an administrative user 104, for example.

During a lock retracting step 344, an embodiment revokes a client's access privilege(s) that were obtained by virtue of the client having been granted the lock. The embodiment also updates replica state accordingly. Retracting step, like many other steps taught herein, may be followed by replicating 308 lock service partition state.

During a client abandoned write lock approach identifying step 346, an embodiment (particularly, a lock service 202) identifies a client either as being a client that accepts abandoned write locks or as being a client that does not accept abandoned write locks. The identification may pertain to a single lock, to a specified group of locks, or to all locks. Step 346 may be accomplished by having the client indicate its approach to the service in a lock request 226, by having a default value embedded in the lock service, by having an administrative user list some or all clients and their respective approaches to abandoned write locks, and/or by other abandonment-reclaim mechanisms 350, for example.

Similarly, during an abandonment-reclaim mechanism using step 348, an embodiment uses during an abandonment-reclaim mechanism 350. For example, a client may use 348 a mechanism 350 by setting a flag 230 in a request 226 for a write lock, and a service 202 may use 348 a mechanism 350 by reading that flag.

The foregoing steps and their interrelationships are discussed in greater detail below, in connection with various embodiments.

Some embodiments provide a method for lock management. The method includes steps taken within a partition 212 of a lock service 202. The service receives 302 a lock request from a client identifying a resource, and determines 304 whether any lock granted to the client on the resource is still in force. If the client has been granted a lock on the resource and the lock is still in force, then the service compares 306 a client instance identifier of the granted lock with a client instance identifier of the lock request, and takes some further action; possibilities are discussed herein. The service also replicates 308 state of the partition (or equivalently, signals readiness for, or initiates replication) to at least one secondary replica of the partition.

In some embodiments, high availability for replicated state is promoted by placing the lock service finite state machine 204 in partition(s) 212. Each partition includes a set of replicas 210; a replica is the unit of failover. A distinguished replica in a partition is called a primary replica, and the rest of the replicas are called secondaries. The primary replica generally receives 302 the requests 226, 232, and the state is replicated 308 from the primary to its secondaries.

In some embodiments, when the client has been granted a lock on the resource and the lock is still in force, any one of the following may occur. If the client instance identifier of the granted lock is the same as the client instance identifier of the lock request, the lock service partition categorizes 312 the lock request as a duplicate request. If the client instance identifier of the granted lock is newer than the client instance identifier of the lock request, the lock service partition categorizes 316 the lock request as a stale request. If the client instance identifier of the granted lock is older than the client instance identifier of the lock request, the lock service partition categorizes 320 the lock request as an abandoned request. In some embodiments, when the service determines 304 there is no lock granted to the client on the resource and still in force, the service grants 324 the lock request prior to replicating 308 state of the partition.

In some embodiments, the service 202 creates 326 an abandonment timer for the client, as a default or in response to a first lock request 226 received 302 from the client, for example. After expiration of an abandonment timer for the client, and before replicating 308 state of the partition, the service may treat 328 an exclusive lock granted to the client as being an abandoned lock, and may treat 332 a non-exclusive lock granted to the client as being unlocked by the client.

In some embodiments, the lock service 202 receives 302 from a client B a request R for a lock L that is currently held by a client A, then attempts 336 to notify the client A that a client other than A has requested the lock L. Some embodiments do this when the waiting queue reaches a specified threshold, and not merely for each lock request placed in the waiting queue (which might be more frequent than desired). The threshold may be configured statically at startup time, or dynamically determined at runtime, e.g., based on memory pressure. For example, in one scenario A gets a lock. B asks for the lock, is told no, and is put in a wait queue for the lock. Then A is sent a message "you have 1 waiter". If the service ascertains 340 that the attempt to notify client A failed, thereby learning 342 that client A is down, then the service treats 328 lock L as having been abandoned by client A. For example, if the message to tell A "you have 1 waiter" is not acknowledged within a specified time, that may indicate top the service that client A is down, so the service treats the lock as having been abandoned by A. The service could also learn 342 that a client A which holds a lock L is down without having attempted 336 to notify client A of a waiter. For example, the service 202 may be told by a failure detector 128 component that A is down, and then treat 328 lock L as having been abandoned by client A.

Thus, some embodiments support two different scenarios for discovering that a client holding a lock has gone down. In one scenario, the lock service learns a client is down when it tries to tell that client someone else wants the lock. In another scenario, the service learns a client is down when the failure detector 128 tells the service. The failure detector 128 may detect the client is down as a result of (a) some other message attempt to reach the client, including a message which does not necessarily concern locks and is not necessarily from the lock service, (b) polling, or (c) an attempt to contact the client after an abandonment timer expires, for example.

In some embodiments, the service performs a method for providing a lock service, at least in part by receiving 302 a lock request from a client, and granting 324 the client a leaseless lock in response to the request. After learning 342 that the client has gone down without releasing the lock, the service 202 treats 328 the lock as having been abandoned by the client. A leaseless lock includes a lock without a lease, that is, a lock with no predetermined expiration. Abandonment timers 222 are not lock leases, because abandonment timers are per-client, not per-lock. The service 202 either learns that the client released the lock or eventually learns that the client is down. The timeout interval 220 for the abandonment timers can be either configured or adaptively computed at runtime based on the system load conditions.

In some embodiments, the client is a client A, the lock is a lock L, and the service 202 performs the following prior to the learning step: receiving 334 from a client B a request R for the lock L that is currently held by client A, and attempting 336 to notify 338 the client A that a client other than A has requested the lock L. The lock service may learn of a lock's abandonment when it tries to tell the client "someone else is waiting for the lock you have". The service may also learn of a lock's abandonment when the service 202 is advised by a failure detector component of a fabric that the client has gone down, without having received an unlock request from the client regarding the lock.

In some cases, the lock is a read lock L, and treating 328 the lock as having been abandoned by the client includes retracting 344 lock L from the client A, receiving 302 a request from a client B for the lock L, and granting 324 lock L to the client B. That is, in handling an abandoned read lock, the client that had the lock and went down no longer gets the lock, and the lock is sometimes given to another client.

In some cases, the lock is a write lock L, and treating 328 the lock as having been abandoned by the client includes retracting 344 lock L from the client A, receiving 302 a request from a client B for the lock L, identifying 346 client B as a client that accepts abandoned write locks, and granting 324 lock L to the client B. For example, the service may identify 346 client B as an administrative client that is authorized to receive abandoned write locks. In handling the abandoned write lock, the client that had the lock and went down no longer gets the lock, and the lock is given to an administrative client or another client which accepts abandoned write locks. In one embodiment, such clients are indicated by a reclaimAbandoned flag 230 which is set to TRUE; other abandonment-reclaim mechanisms can also be used to reclaim abandoned write locks.

Some embodiments support two cases. A regular client 224 can acquire an abandoned lock by intentionally setting the reclaimAbandoned flag to TRUE, or equivalent action to indicate acceptance of abandoned write locks. An administrative client 224 can either release the abandoned lock without acquiring it so the service changes the lock's status to "not abandoned", or else behave like a regular client.

In some cases, the lock is a write lock L, and treating 328 the lock as having been abandoned by the client includes retracting 344 lock L from the client A, receiving 302 a request from a client B for the lock L, identifying 346 client B as a client that does not accept abandoned write locks, and refusing 354 to grant lock L to the client B. In handling the abandoned write lock, the client that had the lock and went down no longer gets the lock, and the lock is not given to a client which does not accept abandoned write locks. In one embodiment, such clients are indicated by a reclaimAbandoned flag 230 which is set to FALSE; other abandonment-reclaim mechanisms can also be used.

In some embodiments, the method includes replicating 308 lock states of a partition, in a fabric or other network. In some embodiments locks 208 include variables whose state indicates which client(s) own(s) the lock, whether the lock is read/write, and which resource 124 the lock guards. In one embodiment, lock state includes:

lockRequestIdentifier (for request duplicate detection)
lockRequestOperation (e.g., lock/unlock)
clientId (i.e. "100")
clientInstance (e.g., "123456789", so the client identification is done on "100:123456789")
lockResourceName (e.g., a handle, object ID, file name, address, etc.)
lockMode (e.g., read/write)
lockTimeout (request timeout)
lockStatus/unlockStatus
reclaimAbandoned It will be appreciated that other embodiments may include different lock state information.

Configured Media

Some embodiments include a configured computer-readable storage medium 112. Medium 112 may include disks (magnetic, optical, or otherwise), RAM, EEPROMS or other ROMs, and/or other configurable memory, including in particular non-transitory computer-readable media (as opposed to wires and other propagated signal media). The storage medium which is configured may be in particular a removable storage medium 114 such as a CD, DVD, or flash memory. A general-purpose memory, which may be removable or not, and may be volatile or not, can be configured into an embodiment using items such as lock service finite state machines 204 and replicas 210, abandonment-reclaim mechanisms 350, and notices 236, in the form of data 118 and instructions 116, read from a removable medium 114 and/or another source such as a network connection, to form a configured medium. The configured medium 112 is capable of causing a computer system to perform method steps for transforming data through distributed lock management as disclosed herein. FIGS. 1 through 3 thus help illustrate configured storage media embodiments and method embodiments, as well as system and method embodiments. In particular, any of the method steps illustrated in FIG. 3, or otherwise taught herein, may be used to help configure a storage medium to form a configured medium embodiment.

Additional Examples

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

By way of introduction, in one embodiment a lock resource 124 is a logical entity that is described by a unique identifier in the system, such as a Globally Unique Identifier (GUID) or a Uniform Resource Identifier (URI). A lock mode 218 is a finite set of values (e.g., an enumeration) that indicates how the distributed resources can be accessed by concurrent transactions. The lock modes supported by one lock manager include the following; additions and other changes are possible in other embodiments:

```
public enum LockMode
{
    Empty,
    SchemaStability,
    SchemaModification,
    Shared,
    Update,
    Exclusive,
    IntentShared,
    IntentUpdate,
    IntentExclusive,
    SharedIntentUpdate,
    SharedIntentExclusive,
    UpdateIntentExclusive,
}
```

In this example, lock compatibility influences whether multiple operations can acquire locks on the same resource 124 at the same time. If a resource is already locked by another operation, a new lock request 226 can be granted only if the mode of the requested lock is compatible with the mode of the existing lock. If the mode of the requested lock is not compatible with the existing lock, the operation requesting the new lock waits for the existing lock to be released or for the lock timeout 220 interval to expire. Compatibility may be implemented using the following:

```
public enum LockCompatibility
{
    Conflict,
    NoConflict,
}
```

In this example, a lock status represents the return value that a lock client will receive in response 234 to making a lock request to the lock service 202 for a certain lock resource. Lock status may be implemented using the following:

```
public enum LockStatus
{
    Success,
    Timeout,
    Pending,
    Abandoned,
    StaleRequest,
    DuplicatePendingRequest,
    DuplicateSuccessRequest,
    UnknownPendingRequest,
    UnknownSuccessRequest
}
```

In this example, an unlock status represents the return value that a lock client will receive in response 234 to making an unlock request 232 to the lock service for a lock resource for which a lock request was granted. Lock status may be implemented using the following:

```
public enum UnlockStatus
{
    Abandoned,
    Success,
    UnknownResource,
    UnknownRequest,
    StaleRequest,
    UnknownClient
}
```

In this example, the lock service 202 exposes the following to a lock client in an interface 352:

```
LockStatus Lock(
    Guid lockRequestIdentifier,
    InstanceId lockClient,
    string lockResourceName,
    LockMode lockMode,
    int lockTimeout,
    int lockAbandonedInterval,
    bool reclaimAbandoned);
UnlockStatus Unlock(
    Guid lockRequestIdentifier,
    InstanceId lockClient,
    string lockResourceName)
```

In this example, as in some other embodiments, each lock request 226 is identified uniquely by a GUID, which can be used to detect a duplicate request. Each lock client 224 sends along with the lock request its own instance id 216, which can be used to detect if the lock client has restarted since the last time it made a lock or unlock request.

In this example, as in some other embodiments, the lock request timeout 214 is an indicator to the lock service 202 of the amount of time from the lock client's point of view that the lock client is willing to wait for this lock request to be granted.

In this example, as in some other embodiments, the lock request abandoned interval 220 is a time interval that is used in the following way. If the lock request is granted to the lock client, this interval 220 specifies the time after which the lock service will attempt 336 to reach the lock client with the purpose of reliably detecting if the lock client is still alive, down or has restarted. Along with this client lifetime check (but not only by this mechanism), in the case where the lock client is not down and has not restarted, the lock service may also deliver lock notifications 338 regarding, for instance, lock contention for this granted lock. In some embodiments, a lock client uses the same abandoned interval for all of its requests. If it does not do so, the abandonment timer may use the smallest value presented by the lock client, for example.

In this example, as in some other embodiments, the abandonment reclaim flag 230 suggests to the service 202 (a.k.a. lock manager) that the lock client is willing to accept the granting of a lock even though the lock has been abandoned by a previous lock owner. This allows application level leader election scenarios, for example.

In some embodiments, the lock manager service 202 fully implements a replicated store. In this way it may utilize replication and failover subsystems developed for other purposes. One mechanism used for scalability is partitioning the entire space of lock resource identifiers/names into integer range partitions.

In one embodiment, when a lock client wishes to acquire a lock on a certain lock resource, it takes the name of the lock resource, and hashes it using a familiar hash mechanism (e.g., MD5) or other hash mechanism. Then the client takes the first 4 significant bytes from the hash, and converts them to an integer. The integer identifies the primary for the partition in the lock manager service that will service that lock request.

The following section describes examples of the lock service finite state machine 204 and corresponding lock client finite state machines 240.

Lock Service State Machine

Lock Request Processing is as follows (per lock service partition):

1. Lock resource identifier 228 is seen for the first time
   a. Create lock entry for the lock resource
   b. Grant 324 the lock request; update the granted lock mode (max between the granted lock mode and the requested lock mode)
   c. Replicate 308 operation
   d. On replication successful, create 326 an abandonment timer for this lock client and reply to lock client with success. The abandonment timer will be used to check the lock client for crash faults by using the failure detection mechanism provided by the distributed fabric.
2. Lock resource name already exists
   a. Lock client 224 is not in the granted list
      i. Lock client is in the waiting queue
         1. Lock client instance id 216 is the same as the one in the granted request
            a. Ignore request, this is client retry (duplicate request 314)
         2. Lock client instance id is older than the one in the granted request
            a. Ignore request, this is a stale request 318 message
         3. Lock client instance id is newer than the one in the granted request
            a. The client restarted and is trying to acquire the same lock; since we have not yet given the lock to the lock client, it is ok to remove his old request from the waiting queue and replace it with this new request in the waiting queue
            b. Replicate 308 operation
      ii. Lock client 224 is not in the waiting queue
         1. Create an entry for the lock request
         2. Waiting queue is not empty
            a. Place this request in the waiting queue (respect FIFO fairness)
            b. Replicate 308 operation
            c. On replication successful, create an expiration timer for this lock request.
         3. Waiting queue is empty
            a. Granted list is empty
               i. Repeat 1.
            b. Granted List is not empty
               i. Lock mode 218 compatible with lock granted
                  1. Repeat 1.
               ii. Lock mode not compatible with lock granted
                  1. Place this request in the waiting queue (respect FIFO fairness)
                  2. Replicate 308 operation
                  3. On replication successful, create an expiration timer for this lock request.
   b. Lock client 224 is in the granted list already
      i. Lock client instance id is the same as the one in the granted request
         1. Return duplicate request 314 status
      ii. Lock client instance id is older than the one in the granted request
         1. Ignore request, this is a stale message
      iii. Lock client instance id is newer than the one in the granted request 1. Return abandoned status; this is where the system is eventually going to be since at this point it is possible that the lock client went down, came back up, but the abandoned timer did not yet fire; the abandoned timer 222 will though eventually fire, putting the lock in abandoned mode Two observations may also be made regarding asynchronous aspects of finite state machine lock service 202 operations in this example. First, if a lock abandonment timer 222 expires for a granted lock request, the service probes the lock client using the failure detector 128 to check if the lock client experienced a crash fault. If the client crashed, and if the lock mode was exclusive, the service puts the lock 208 in the abandoned state, replies to all in the waiting queue with abandoned status, and raises an alert in the system. If the lock mode was shared, then the service treats 332 the lock as if an unlock operation occurred. If the client is still alive with the same instance id 216, then the service re-enqueues the timer, since the lock client is not done with its processing. Then a replicate 308 operation is performed.

Second, if an expiration timer expires, the service 202 replies to the lock client with a timeout response 234. The service ignores the expiration if the client is down, since it has not been granted the lock anyway. The service 202 traverses the waiting queue to see if new waiters could be now granted the lock; if so, the service does the grant. A replicate 308 operation is then performed.

Consider next the following example of finite state machine unlock request processing:

Unlock Request Processing is as follows (per lock service partition):
1. Lock resource exists
   a. Lock client is 224 in the granted list
      i. Remove lock client from the granted list
      ii. Update new lock granted mode 218
      iii. If no lock owner, set lock mode 218 to empty
      iv. Traverse the waiting queue to see if new waiters could be now granted the lock; if so, do so
      v. Replicate 308 operation
      vi. Reply to lock client with unlock success response 234
      vii. If the lock was abandoned, reply with unlock abandoned status
   b. Lock client is not in the granted list
      i. This is a stale request 318, ignore it
2. Lock resource does not exist
   a. Return unlock status non-existent The following is an example of a corresponding client finite state machine 240:

Lock Client State Machine

Lock Response Processing is as follows:
1. If this is not the intended lock client instance id 216, ignore request
2. If status is granted for a request 226 that is not the current request, unlock it
3. Create the current lock request 226 and send it
   a. Lock request is granted 324
      i. Return success to higher layers of the application
   b. Lock request is duplicate request 314
      i. Repeat 2.
   c. Lock request timeout 214
      i. Return timeout to higher layers of the application
   d. Lock request is abandoned request 322
      i. Raise alert in the system
4. If current request times out locally, return timeout to higher layers of the application Unlock Response Processing is as follows:
1. Ignore old unlock responses
2. Retry until getting unlock success for the current granted request In this embodiment, higher application layers will not see any lock request status messages other than success or timeout; the other complexity is taken care of in the finite state machines described above. This approach can promote a clean and efficient programming model.

Some embodiments employ a failure detection mechanism provided by the fabric to reduce or solve problems caused by lock abandonment, and some do so in a scalable lock manager service 202. By using a replicated state machine approach, some embodiments promote a design which is efficient, compact, and deals with a wide variety of message and crash faults that may occur in large scale distributed systems.

CONCLUSION

Although particular embodiments are expressly illustrated and described herein as methods, as configured media, or as systems, it will be appreciated that discussion of one type of embodiment also generally extends to other embodiment types. For instance, the descriptions of methods in connection with FIG. 3 also help describe configured media, and help describe the operation of systems and manufactures like those discussed in connection with other Figures. It does not follow that limitations from one embodiment are necessarily read into another. In particular, methods are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification.

While exemplary embodiments have been shown in the drawings and described above, it will be apparent to those of ordinary skill in the art that numerous modifications can be made without departing from the principles and concepts set forth in the claims. Although the subject matter is described in language specific to structural features and/or procedural acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which come within the meaning and range of equivalency of the claims are to be embraced within their scope to the full extent permitted by law.

What is claimed is:

1. A method for lock management, the method utilizing at least one logical processor in operable communication with at least one memory, the method comprising the following steps within a partition of a lock service:

receiving a lock request from a client identifying a resource;

determining that a lock granted to the client on the resource is still in force;

comparing a client instance identifier of the granted lock with a client instance identifier of the lock request and categorizing the lock request according to one of the following occurrences:

the client instance identifier of the granted lock is the same as the client instance identifier of the lock request, and the lock service partition categorizes the lock request as a duplicate request;

the client instance identifier of the granted lock is newer than the client instance identifier of the lock request, and the lock service partition categorizes the lock request as a stale request;

the client instance identifier of the granted lock is older than the client instance identifier of the lock request, and the lock service partition categorizes the lock request as an abandoned request;

and replicating state of the partition to at least one secondary replica of the partition.

2. The method of claim 1, further comprising creating an abandonment timer for the client.

3. The method of claim 1, further comprising performing one of the following steps after expiration of an abandonment timer for the client, and then replicating state of the partition:

treating an exclusive lock granted to the client as being an abandoned lock;

treating a non-exclusive lock granted to the client as being unlocked by the client.

4. The method of claim 1, further comprising:

receiving from a client B a request R for a lock L that is currently held by a client A; and attempting to notify the client A that a client other than A has requested the lock L.

5. The method of claim 4, further comprising:

ascertaining that the attempt to notify client A failed; and then treating lock L as having been abandoned by client A.

6. The method of claim 1, further comprising:

learning that a client A which holds a lock L is down; and then treating lock L as having been abandoned by client A.

7. A computer-readable storage medium configured with data and with instructions that when executed by at least one processor causes the processor(s) to perform a method for providing a lock service, the method comprising the steps of:

receiving a lock request from a client;

granting the client a lock in response to the request;

comparing a client instance identifier of the granted lock with a client instance identifier of the lock request and categorizing the lock request according to one of the following occurrences:

the client instance identifier of the granted lock is the same as the client instance identifier of the lock request, and the lock service partition categorizes the lock request as a duplicate request;

the client instance identifier of the granted lock is newer than the client instance identifier of the lock request, and the lock service partition categorizes the lock request as a stale request;

the client instance identifier of the granted lock is older than the client instance identifier of the lock request, and the lock service partition categorizes the lock request as an abandoned request;

learning that the client has gone down without releasing the lock; and treating the lock as having been abandoned by the client.

8. The configured medium of claim 7, wherein the client is a client A, the lock is a lock L, and the method further comprises prior to the learning step:

receiving from a client B a request R for the lock L that is currently held by client A; and attempting to notify the client A that a client other than A has requested the lock L.

9. The configured medium of claim 7, wherein the client is a client A, the lock is a read lock L, and treating the lock as having been abandoned by the client comprises:

retracting lock L from the client A;

receiving a request from a client B for the lock L; and granting lock L to the client B.

10. The configured medium of claim 7, wherein the client is a client A, the lock is a write lock L, and treating the lock as having been abandoned by the client comprises:

retracting lock L from the client A;

receiving a request from a client B for the lock L;

identifying client B as a client that accepts abandoned write locks; and granting lock L to the client B.

11. The configured medium of claim 7, wherein the client is a client A, the lock is a write lock L, and treating the lock as having been abandoned by the client comprises:

retracting lock L from the client A;

receiving a request from a client B for the lock L;

identifying client B as a client that does not accept abandoned write locks; and refusing to grant lock L to the client B.

12. The configured medium of claim 7, wherein the learning step comprises being advised by a failure detector component that the client has gone down, without having received an unlock request from the client regarding the lock.

13. The configured medium of claim 7, wherein the method further comprises replicating lock states of a partition in a fabric.

14. A computing system comprising:

at least one logical processor;

a memory in operable communication with the logical processor(s), the memory located in at least one machine;

a replicated finite state machine residing in the memory and operable to receive lock requests from clients, deny lock requests, grant leaseless locks in response to lock requests, and discover abandoned locks;

the system further characterized in that the system is operable to compare a client instance identifier of a granted lock request with a client instance identifier of the lock request and categorize the lock request according to one of the following occurrences:

the client instance identifier of the granted lock is the same as the client instance identifier of the lock request, and the system categorizes the lock request as a duplicate request;

the client instance identifier of the granted lock is newer than the client instance identifier of the lock request, and the system categorizes the lock request as a stale request;

the client instance identifier of the granted lock is older than the client instance identifier of the lock request, and the system categorizes the lock request as an abandoned request.

15. The computing system of claim 14, further comprising a set of locks residing in the memory, each lock having a lock-mode.

16. The computing system of claim 14, further comprising a set of locks residing in the memory, each lock having a lock-request-abandoned-interval.

17. The computing system of claim 14, further comprising a set of locks residing in the memory, each lock having a lock-request-timeout.

18. The computing system of claim 14, further comprising a lock request interface residing in the memory, the lock request interface having an abandonment-reclaim mechanism, namely, a mechanism for indicating whether a client will accept a write lock that has been abandoned by another client.

19. The computing system of claim 14, further comprising an abandonment timer for at least one client.

20. The computing system of claim 14, further comprising a failure detector component which detects that a client has gone down, without having received an unlock request from the client regarding a lock granted to the client.

* * * * *